United States Patent
Adams

(10) Patent No.: US 8,945,387 B2
(45) Date of Patent: Feb. 3, 2015

(54) HOLLOW FIBER MEMBRANE MODULE FOR USE IN A TUBULAR PRESSURE VESSEL

(75) Inventor: Nicholas William H. Adams, Hamilton (CA)

(73) Assignee: General Electric Company, Schenectady, NY (US)

( * ) Notice: Subject to any disclaimer, the term of this patent is extended or adjusted under 35 U.S.C. 154(b) by 757 days.

(21) Appl. No.: 13/213,075

(22) Filed: Aug. 18, 2011

(65) Prior Publication Data
US 2013/0043187 A1 Feb. 21, 2013

(51) Int. Cl.
*B01D 63/02* (2006.01)
*B01D 63/04* (2006.01)
*B01D 65/02* (2006.01)
*C02F 1/44* (2006.01)
*B01D 61/08* (2006.01)

(52) U.S. Cl.
CPC .............. *B01D 63/043* (2013.01); *B01D 65/02* (2013.01); *C02F 1/44* (2013.01); *B01D 61/08* (2013.01); *B01D 2313/04* (2013.01); *B01D 2313/13* (2013.01); *B01D 2313/26* (2013.01); *B01D 2321/18* (2013.01); *C02F 1/441* (2013.01); *C02F 1/442* (2013.01); *C02F 2303/16* (2013.01)
USPC ............ 210/321.88; 210/321.69; 210/321.79; 210/321.8; 210/321.89

(58) Field of Classification Search
CPC ...... B01D 63/02; B01D 63/04; B01D 63/043; B01D 2313/13; B01D 2319/02; B01D 2319/025; B01D 2317/02; B01D 65/02; B01D 2321/18; B01D 2321/185; B01D 2313/26
See application file for complete search history.

(56) References Cited

U.S. PATENT DOCUMENTS

| | | | |
|---|---|---|---|
| 4,451,369 A | | 5/1984 | Sekino et al. |
| 4,824,566 A | * | 4/1989 | Thibos ..................... 210/321.87 |
| 5,543,002 A | * | 8/1996 | Brinda et al. .................... 156/77 |
| 6,251,275 B1 | | 6/2001 | Rekers |
| 7,410,581 B2 | | 8/2008 | Arnold et al. |

(Continued)

OTHER PUBLICATIONS

NORIT; Membrane Technology, XIGA from http://www.noritmt.com/products/xiga; printed on Sep. 5, 2011.

(Continued)

*Primary Examiner* — Benjamin Kurtz
(74) *Attorney, Agent, or Firm* — GE Global Patent Operation

(57) ABSTRACT

A hollow fiber membrane element may be used in a pressure vessel similar to those used with spiral wound elements, optionally as a replacement for a spiral wound element. A connecting sleeve is used to connect the insides of adjacent elements to each other or to one or more fittings in communication with the outside of the pressure vessel. The element has hollow fiber membranes suspended between two potting heads spaced apart by a cross flow tube that is open at the outside faces of both potting heads. The potting heads are each adapted to slide into an end of a connecting sleeve. A module has one or more hollow fiber elements located inside of a pressure vessel. At least one port is provided in communication between the outsides of the one or more elements and the outside of the vessel. An aerator may be provided on the bottom of the vessel. In an outside-in flow process, feed water enters through the port and flows to the outside of one or more elements while permeate is removed through a fitting at one or both ends of the module. In an inside-out process, feed water enters through a fitting and permeate is removed through a port.

12 Claims, 3 Drawing Sheets

(56) References Cited

U.S. PATENT DOCUMENTS

2002/0153318 A1 10/2002 Watari et al.
2008/0035563 A1* 2/2008 Badard et al. ............. 210/636

OTHER PUBLICATIONS

NORIT; Membrane Technology, XIGA UF from http://www.noritmt.com/archive/xiga%20uf/; printed on Sep. 5, 2011.

NORIT; X-Flow, XIGA & Aquaflex concept from http://www.x-flow.com/products/xige%20%26%20aquaflex/; printed on Sep. 5, 2011.

NORIT; X-Flow- The XIGA hollow fibre membrane produces the highest-quality water, from http://www.x-flow.com/industrial/xiga.php; printed on Sep. 5, 2011.

Norit Membrane Technology B.V.; XIGA, from http://www.environmental-expert.com/products/xiga-88276; printed on Sep. 5, 2011.

NORIT; X-Flow—Recycling of Wastewater; 15 pages; undated.

Search Report and Written Opinion from corresponding PCT Application No. PCT/US2012/049504 dated Mar. 4, 2013.

\* cited by examiner

HOLLOW FIBER MEMBRANE MODULE FOR USE IN A TUBULAR PRESSURE VESSEL

FIELD

This specification relates to membrane filtration, and in particular to hollow fiber membrane modules and to membrane elements for use in a generally tubular pressure vessel.

BACKGROUND

Nanofiltration (NF) and reverse osmosis (RO) membrane elements are often made using spiral wound membrane elements contained in a pressure vessel, alternatively called a shell. Within the elements, flat sheet membranes are formed into one or more envelopes each enclosing a sheet of permeate spacer. The envelopes are attached at an open edge to a porous permeate tube, and then wound around the permeate tube with adjacent envelopes separate by sheets of feed spacer material. This assembly is then covered in an outer wrap. The completed element may be inserted into a pressure vessel for use. In outside-in operation, which is typical, feed water is pumped into one end of the pressure vessel and flows through the feed spacer. A portion of the feed water, the permeate, passes through the membrane. The permeate flows through the permeate spacer to the permeate tube and can be withdrawn from a fitting at an end of the permeate tube. Another portion of the feed water, the retentate or concentrate, does not pass through the membrane and is withdrawn from the other end of the pressure vessel.

The pressure vessel is typically a generally tubular shell having a length and diameter chosen to accommodate one or more spiral wound elements of one of a variety of standardized sizes. For example, a nominal 8 inch RO element has a length of about 40 inches (1016 mm) and a diameter of about 7.9 inches (200 mm). Larger and smaller nominal diameters, for example 4 inch and 16 inch, are also available. The pressure vessel has an inside diameter slightly larger than the outside diameter of the membrane element, and a length sufficient to accept the membrane element with room for feed inlet and outlet fittings at the ends. If there are multiple elements, they are typically arranged end to end in a longer pressure vessel. Additional space is provided for interconnect fittings to attach the ends of the permeate tubes of the various elements together.

U.S. Pat. No. 6,251,275 describes an element using hollow fiber membranes that may be inserted into a shell. The hollow fiber membranes are suspended between two potting heads and surrounded by a solid housing. Feed water is pumped into the lumens of the membranes. The housing prevents permeate passing through the hollow fiber membranes from escaping from the element into the remainder of the pressure vessel. The permeate is removed from the element through a permeate discharge line in communication with the interior of the housing.

INTRODUCTION TO THE INVENTION

The following paragraphs are intended to introduce the reader to the invention, which will be defined by the claims, and to the detailed description, but not to limit any claimed invention.

One measure of the capacity of a membrane system is liquid throughput per unit area of floor space, alternately called footprint, occupied by the system, or per unit volume occupied by the system. In general, hollow fiber membranes may be capable of providing a higher membrane surface area per unit volume than flat sheet membranes. Accordingly, a hollow fiber membrane element may be able to provide increased throughput relative to a spiral wound element. Nevertheless, spiral wound elements are more commonly used for nanofiltration and reverse osmosis applications. Because of the large number of installed filtration systems using spiral wound elements, and the amount of existing equipment designed around spiral wound elements, it would be desirable if a hollow fiber element could use a pressure vessel with dimensions similar to those used with spiral wound elements. It would be further desirable if a hollow fiber element could fit into an existing pressure vessel holding one or more spiral wound elements so as to allow the spiral wound elements to be replaced with hollow fiber elements. In order to simplify such a replacement, or to generally allow greater use of existing equipment designed for spiral wound elements, it would also be advantageous if multiple hollow fiber elements could be arranged end to end inside a single pressure vessel and operated with feed, permeate and retentate connections provided only at the ends of the pressure vessel.

A connecting sleeve, alternatively called a connector, facilitates the use of a hollow fiber element inside of a generally tubular pressure vessel. The connecting sleeve may be used to connect the inside of an upstream hollow fiber element with the inside of a downstream hollow fiber element, or to connect the inside of a hollow fiber element with an upstream or downstream connection to the outside of the vessel. The connecting sleeve also allows fluids to flow between an upstream or downstream connection to the outside of the vessel and the outside of an element, or from the outside of an upstream element to the outside of a downstream element. The sleeve has a tubular, or ring-shaped, body with an outer diameter less than the inner diameter of the pressure vessel. A set of spacers protrude outwardly from the outside of the sleeve to engage the inside diameter of the pressure vessel without preventing fluid flow across the sleeve between the outside of the sleeve body and the inside of the vessel. The inside of the sleeve body is adapted to receive into its ends one or more of a potting head of a hollow fiber element and a fitting. Optionally, a separator may be provided inside of the body to separate elements or fittings inserted into opposite ends of the body, or to provide a registered depth of insertion into the sleeve.

A fitting described herein is adapted to be inserted into an end of the connecting sleeve. The fitting may be provided at one end with one or more O-rings to seal against the inside of the connecting sleeve. The other end of the fitting may be adapted to facilitate a connection to the outside of the vessel.

A hollow fiber element is described herein. The element has hollow fiber membranes suspended between two opposed generally cylindrical potting heads. The potting heads are spaced apart by one or more tubes that are open at the outside faces of both the potting heads. The ends of the membranes are open at the outside face of at least one of the potting heads. The potting heads are each adapted to slide into an end of a sleeve. The potting heads may be provided with one or more O-rings to seal against the inside of the connecting sleeve.

A membrane filtration module is described herein. The module has a generally tubular pressure vessel. One or more hollow fiber elements are located inside of the vessel. A sleeve is provided at the upstream and downstream ends of the one or more elements. A fitting is provided in the sleeve at one or both ends of the module. If there are multiple elements, the ends of adjacent elements are also connected together by a sleeve. At least one port is provided in communication with the outside of the one or more elements.

An aerator for a membrane filtration module is also described herein. The aerator is adapted to fit on the bottom of a tubular pressure vessel. The aerator receives air from an inlet edge and discharges bubbles from openings distributed along the length of the aerator. The aerator may be provided between two sleeves in a filtration module as described in the paragraph above. Air provided to an inlet through the vessel flows into the aerator. Bubbles collect at the top of the vessel and form an air pocket that is vented from an air outlet of the vessel. Optionally, air may flow to or from an aerator past a sleeve.

A filtration module as described herein may be used in one or more filtration processes described herein. In an outside-in process, feed water enters through a port at one end of the vessel, flows around the outside of one or more elements, and exits through a port at another end of the vessel. Permeate is removed through a fitting at one or both ends of the module. In an inside-out process, feed water enters through a fitting at one end of the module and exits through a fitting at the other end of the module. Permeate is removed through a port in communication with the outside of one or more elements in the module. Optionally, both process described above may be operated in a dead end mode without feed water exiting the module during permeation. In these cases, a retentate outlet is optional. In a module fitted with an aerator, periods of dead end filtration may be separated by deconcentration procedures in which the vessel is vented, a gas or a two-phase flow is injected into the vessel through the aerator, and the vessel is then swept or drained or both.

DETAILED DESCRIPTION

The following section provides a detailed description of various specific apparatus or processes, which will include a description of at least one example of an embodiment of each claimed invention. Other embodiments of the claimed inventions may also be made or used.

Figure 1:
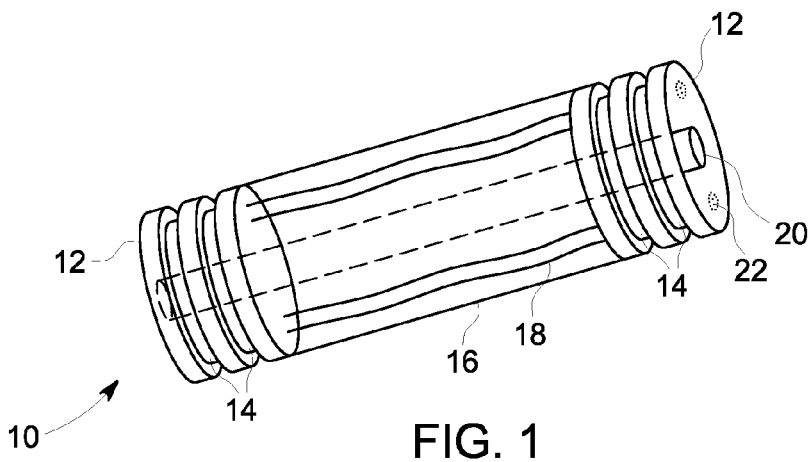
FIG. 1 is a schematic isometric drawing of a hollow fiber membrane element.

FIG. 1 shows a hollow fiber membrane filter element 10. The element 10 has two opposed generally cylindrical potting heads 12. Each of the potting heads 12 has one or more grooves 14 each adapted to receive an O-ring. The outside diameter of the potting heads 12 allows the potting heads to be inserted into a connector to be described below. O-rings (not shown in FIG. 1) inserted into grooves 14 provide a seal between the potting heads 12 and the connector. The outside diameter of the potting heads may be in the range of 170-190 mm, or another diameter that is compatible with a connector that can be inserted into a tubular pressure vessel having an inside diameter suitable for use with a nominal 8 inch spiral wound element. Smaller or larger diameters may also be used, for example diameters appropriate to replace nominal 4 inch, 12 or 16 inch spiral wound elements.

Hollow fiber membranes 18 extend between, and are attached to, the potting heads 12. The membranes 18 are potted in at least one, and optionally both, of the potting heads 12 such that open ends 22 of the membranes 18 are open to the outer face of a potting head 12. If the second ends of the membranes 18 are not open, they may be sealed by the material of a potting head 12. The hollow fiber membranes 18 are bounded by a periphery 16. The periphery 16 may be entirely imaginary, there being no physical restraint on the membranes 18 other than the attachment of their ends to the potting heads 12. Alternatively, the periphery 16 may be defined by a porous structure, such as a sheet with openings, a perforated sleeve or a screen, wrapped into a tube and placed between the potting heads 12. Such a sheet or screen may be useful for protecting the membranes 18 during handling or in operation and for ensuring that the membranes 18 remain within the periphery 16. One or more cross flow tubes 20 are attached to the potting heads 12, preferably by being potted into the potting heads 12. A cross flow tube 20 is open to the outer face of both potting heads 12 to allow fluids to pass through the element 10 by a passageway within the diameter of the element 10. A cross flow tube 20 may also function as a structural piece keeping the potting heads 12 spaced apart from each other.

Only a few hollow fiber membranes 18 are shown to simplify FIG. 1 but the element may have thousands or tens of thousands of membranes 18. The packing density may be, for example, 40 percent or more or 50 percent or more. To help provide a material increase in membrane surface area over a comparably sized spiral wound element, the membranes 18 should have a small outside diameter. For example, the membranes 18 may have an outside diameter of less than 2 mm, preferably less than 1 mm. For inside-out flow, the inside diameter of the membranes 18 is preferably at least half of the outside diameter.

With small diameter membranes 18, the transmembrane pressure (TMP) loss due to resistance to flow in the insides (lumens) of the membranes 18 may be high. This is particularly the case where the element 10 may be used in a system originally designed for a spiral wound element where the driving pressure is over 100 kPa, possibly up to one thousand kPa. To reduce TMP loss, the length of the element 10 may be reduced compared to the typical length (about 1016 mm) of a spiral wound module. For ease of retrofitting the element 10 into a system originally designed for a spiral wound module, the element 10 may be about half the length of a typical spiral wound element. With some allowance, for example 10 to 20 mm, for spacing between adjacent elements 10, an element length of about 500 mm between the outside faces of the potting heads is suitable for using two elements 10 to replace a single spiral wound element. TMP loss will be under 1 psi while operating at 50 gfd with 0.6 mm outside diameter, 0.35 mm inside diameter membranes 18 that are 500 mm long. Assuming an exposed fiber length of 400 mm, an element 10 with an outer diameter of 180 mm, with 0.6 mm outside diameter membranes 18 potted at a packing density of 50% in a ring of 170 mm in outer diameter surrounding a central 50 mm cross flow tube 20, the surface area of the element 10 is about 300 square feet (28 square meters). Two such elements 10 replacing a nominal 8 inch spiral wound element would have a combined membrane surface area of about 60 square meters.

Figure 2:
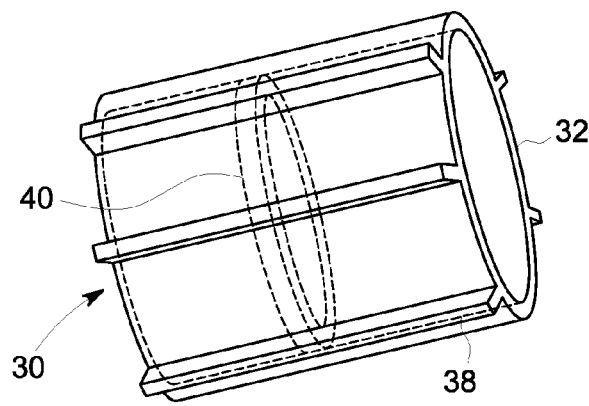
FIG. 2 is an isometric drawing of a connector sleeve.
Figure 3:
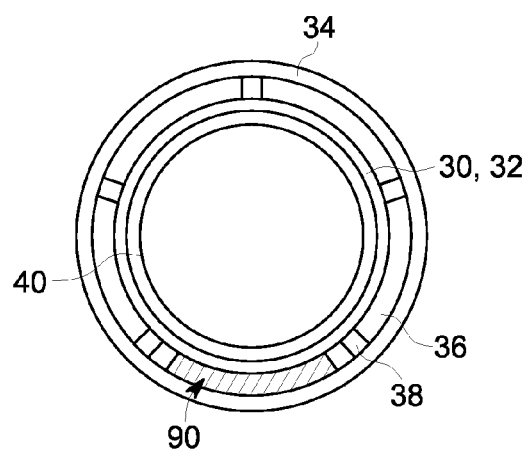
FIG. 3 is an end view of a connector sleeve mounted inside of a pressure vessel with an optional aerator.

FIGS. 2 and 3 show a connector 30. The connector 30 is shown on its own in an isometric view in FIG. 2 and installed in a tubular pressure vessel 34 in an end view in FIG. 3. Connector 30 can be used, for example, to connect two elements 10 together within the pressure vessel 34. Connector 30 has a ring shaped body 32 having an inner diameter slightly larger than the outer diameter of the potting heads 12 of element 10. The potting head 12 of an element 10 can therefore be slid into one end of a connector 30. The outer diameter of the body 32 is less than the internal diameter of a pressure vessel 34 to provide a gap 36 for fluids to flow past the outside of the connector 30. The gap 36 may be, for example, between 5 and 20 mm wide.

The connector 30 has spacers 38 extending from its outer surface to abut the inner surface of the pressure vessel 34. The spacers 38 maintain the gap 36 and also center the connector 30 in the pressure vessel 34. The spacers 38, however, do not prevent the flow of fluids through the gap 36. The spacers 38 may be, for example, longitudinal ribs as shown or an array of bumps. The connector 30 may also have one or more separators 40 extending inwards from its inner diameter. The separator 40 may be, for example, a continuous ring as shown or a series of discontinuous bumps. A separator 40 is optional but is useful for ensuring that the outside faces of potting heads 12 from two adjacent elements 10 do not contact each other. A space is preferably provided for permeate to flow from the open ends 22 of membranes 18 to a cross flow tube 20. The separator 40 is also useful for providing a registered depth of insertion for elements 10 and fittings inserted into a connector 30.

Figure 4:
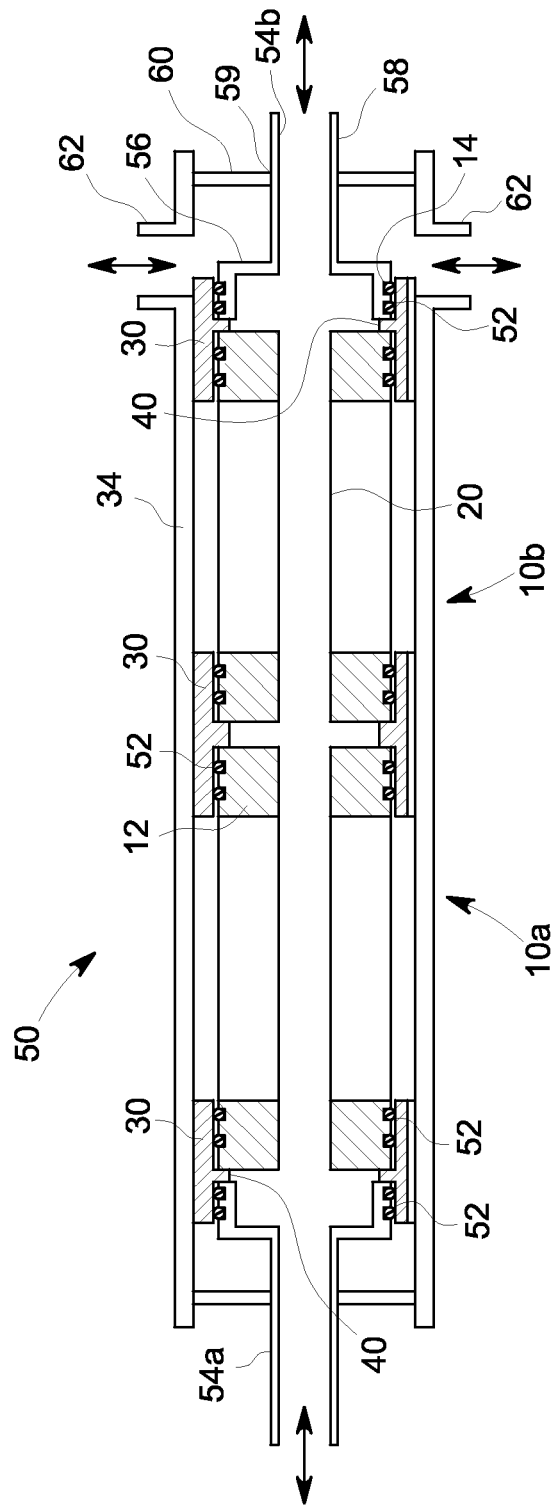
FIG. 4 is a cut open side view of a module.

FIG. 4 shows a cross-section of a module 50. The module 50 has two elements 10a, 10b connected end to end and installed in a pressure vessel 34. Alternatively, there could be one, or three, four or more elements 10 in the module 50. A connector 30 is provided between the potting heads 12 of each pair of adjacent elements 10 and at the beginning or end of the series of elements 10, or preferably at both the beginning and end of the series. Each potting head 12 is fitted with one or more O-rings 52 and slid into one end of a connector 30, preferably until it reaches the separator 40. The O-rings 52 create a seal between the outsides of the potting heads 12 and the insides of the connector 30.

A fitting 54 may be provided at one or both ends of the module 50. The fitting 54 has a manifold 56 and a shaft 58. The manifold 56 has an outer diameter sized to fit into a connector 30 and grooves 14 to accept one or more O-rings 52. The O-rings 52 create a seal between the outside of the manifold 56 and the inside of the connector 30. Alternatively, the manifold 56, with or without grooves 14, may be glued or welded to the connector 30. Further alternatively, the connector 30 and fitting 54 may be made in one piece. The manifold 56 is open at one end to a potting head 12, including the cross-flow tube 20 and the open ends 22 of the membranes 14 if any, and at its other end to the shaft 58. The shaft 58 extends through an opening 59 in an end cap 60 of the pressure vessel 34 and is sealed, for example by an adhesive, a removable seal or welding, to the opening 59 to prevent leaks. The fitting 54 thus provides a means for connecting the inside of the one or more elements 10 in a module 50 to a connection point outside of the module 50. As is apparent from FIG. 4, a shaft 58 is connected to every element 10 in a module through the cross flow tubes 20 and possibly also or alternatively through the lumens of the membranes 18 and the gaps between adjacent potting heads 12.

A second fitting 54 may be provided at the other end of the module 50. In cases where only one connection to the inside of an element 10 is required, however, the second fitting 54 may be sealed closed. Alternatively, the second fitting 54 may be omitted and the cross-flow tube 20 and any open ends 22 of the membranes 18 at that end of the module 50 may be sealed by other means. For example, the connector 30 may be replaced by an analogous structure with a flat plat replacing the separator 40. In a situation in which one end of a module 50 is a dead end to all fluid flow, a connector 30 may also be omitted at the dead end of a module 50, and the potting head 12 of an element 10 may be inserted and sealed into a diameter reducing ring or closed cap at the dead end of the module 50. The connector 30 may similarly be omitted at any end of the module 50 that will have fluid communication with the lumens of the membranes 18 by sealing the potting head 12 of an element 10 to the end of the module 50 upstream of an opening 59 and using the opening 59 to provide fluid communication with the lumens of the membranes 18 directly.

A fluid connection to the outside of the one or more elements 10 (that is, the outsides of the membranes 18 in an element 10) are provided by one or more ports 62 in the cylindrical wall of the pressure vessel 34. Alternatively, a port 62 may be provided through a hole in the end cap 60. Even though the port 62 may be upstream or downstream of the last element 10, a fluid connection between the port 62 and the outside of the element 10 is provided by the gap 36 between a connector 30 and the pressure vessel 34. Similarly, this fluid connection extends to the outside of any other elements 10 in the module 50 through the gaps 36 around connectors 30 between adjacent elements 10. Although the cap 60 is shown as a flat plate in FIG. 4, cap 60 may alternatively have a more complex shape including ports 62 in roughly the location shown in FIG. 4 and attached by way of a flange to a flange on the end of a pressure vessel 34.

Still referring to FIG. 4, one operating configuration, using inside-out flow, is shown. Feed water enters at one end of module 50 through shaft 54a and exits, as concentrate, from the other end of the module 50 through shaft 54b. A restriction to flow in or downstream of shaft 54b causes a pressure differential between shaft 54a and ports 62. Feed water is distributed, through the cross flow tubes 20 and the spaces between potting heads 12 of adjacent elements 10 created by separators 40, to the open ends 22 of the membranes 18. Permeate passing though the membranes 18 flows through one or more gaps 36 outside of the connectors 30 to reach the ports 62. For outside-in flow, feed water enters through ports 62 and permeate exits through one or both of shafts 54a, 54b. Optionally, one of the ports 62 may be relocated to the other end of the module 50 and feed water may enter through one port 62 and exit, as concentrate, through the other port 62.

Figure 5:
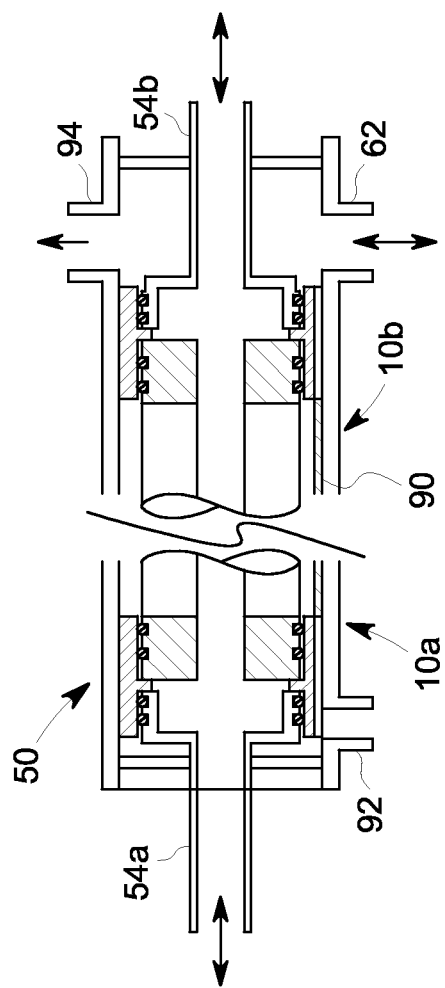
FIG. 5 is a cut open side view of another module having an aerator.

FIG. 5 shows a side view of a module 50 fitted with an aerator 90. Referring to FIG. 3, aerator 90 fits into a part of the gap 36 outside of a connector 30. Aerator 90 is fitted between two connectors 30 with the ends of the aerator 90 held by an interference or compression fit between the connectors 30 and the pressure vessel 34. The aerator 90 is open at one end, or both ends, and has air discharge holes on its upper surface. An air inlet 92 through the wall of the pressure vessel 34 allows pressurized air to be pumped through a gap 36 into the aerator 90. There may be a connecting pipe between the air inlet 92 and the aerator 90 or air may collect in the gap and then flow into an opening in the aerator 90. Bubbles produced at the top of the aerator 90 rise past the membranes 18, thus scouring the membranes 18 and removing foulants. The bubbles collect at the top of the module 50 and flow to an air outlet 94, passing through one or more gaps 36 if necessary. An air inlet 92 may be provided for each element 10, or for pairs of elements 10, to help distribute air more nearly evenly to multiple aerators 90. In one mode of operation, filtration is performed by way of periods of dead end flow in which feed water enters from a port 62 and exits as permeate through one or both of shafts 54a, 54b. In between periods of dead end filtration, port 62 is closed and air inlet 92 and air outlet 94 are opened. Compressed air is provided to the aerator 90 to flow bubbles past the membranes 18 for several seconds. Depending on their pore size, the membranes 18 may also be backwashed while the bubbles are provided with the excess liquid also exiting from air outlet 94. Port 62 is then opened to drain the module 50 of solids released by the bubbles before filtration begins again. Optionally, the module may also be flushed by flowing feed water into air inlet 92 and out through air outlet 94 or port 62 for a few seconds. Further optionally, air outlet 92 may be closed and compressed air may be provided to air outlet 94 while port 62 is open to speed up a draining step and entrain more solids in the draining water.

I claim:

1. A hollow fiber membrane module comprising,
 a) a generally tubular pressure vessel;
 b) at least two hollow fiber elements located inside of the vessel, each of the hollow fiber elements having a pair of opposed potting heads with a plurality of hollow fiber membranes extending between the potting heads, the ends of the hollow fiber membranes being open to an outer face of at least one of the potting heads, the element having at least one cross flow tube for fluid flow from the outer face of one of the potting heads to the outer face of the other potting head; and
 c) a connector located inside of the vessel between the at least two hollow fiber elements, the connector having a tubular body spaced from the inside of the pressure vessel by a gap;
 d) a port into the vessel adapted to provided fluid communication between the outside of the vessel and the outer surfaces of the membranes;
 e) an opening into the vessel adapted to permit communication between the outside of the vessel and the lumens of the membranes; and,
 f) an aerator at the bottom of the tubular pressure vessel, wherein an inlet of the aerator is located in the gap below the body of the connector, and the module comprises an air inlet adapted to permit compressed air to be discharged into the gap near the inlet of the aerator, wherein
 g) each of the at least two hollow fiber elements has one of its potting heads sealed to the inside of the tubular body of the connector such that the ends of the hollow fiber membranes of one of the hollow fiber elements are in fluid communication with the cross flow tube of the other hollow fiber element through the connector.

2. The module of claim 1 wherein the connector has spacers extending from the outside of the tubular body of the connector to the inner surface of the pressure vessel, the spacers passing through the gap but not preventing fluid flow through the gap.

3. The module of claim 2 wherein the connector has a separator extending inwards from the connector between the potting heads of the at least two hollow fiber elements.

4. The module of claim 1 wherein each of the hollow fiber elements comprises a cross flow tube open to the outer face of each of the potting heads.

5. The module of claim 4 wherein the membranes have an outside diameter of 2 mm or less or 1 mm or less.

6. The module of claim 5 wherein the length of each of the two or more elements is 1016 mm or less between the outer faces of the potting heads.

7. The module of claim 6 wherein the wherein the length of each of the two or more elements is 508 mm or less between the outer faces of the potting heads.

8. The module of claim 1 further comprising a second connector, wherein one of the at least two hollow fiber elements has one of its potting heads sealed to the inside of the second connector.

9. The module of claim 8 further comprising a fitting, the fitting being sealed to the inside of the second connector and extending through the opening, wherein communication between the outside of the vessel and the lumens of the membranes is provided through the fitting.

10. The module of claim 1 wherein the aerator receives air from an inlet at one end of the aerator and discharges bubbles from openings distributed along the length of the aerator.

11. The module of claim 1 wherein the connector comprises longitudinal ribs extending across the gap on both sides of the inlet of the aerator.

12. The module of claim 1 wherein the potting heads each have at least one grooves and an O-ring installed in the groove such that the O-ring provides a seal between the outer diameter of a potting head and the inside diameter of the connector.

* * * * *